(12) United States Patent
Hong et al.

(10) Patent No.: US 12,499,970 B2
(45) Date of Patent: Dec. 16, 2025

(54) DEEP LEARNING BASED VARIANT CALLING USING MACHINE LEARNING

(71) Applicant: Myriad Women's Health, Inc., South San Francisco, CA (US)

(72) Inventors: Sun Hong, South San Francisco, CA (US); Kyle Beauchamp, South San Francisco, CA (US); Kevin Haas, South San Francisco, CA (US)

(73) Assignee: Myriad Women's Health, Inc., South San Francisco, CA (US)

( * ) Notice: Subject to any disclaimer, the term of this patent is extended or adjusted under 35 U.S.C. 154(b) by 539 days.

(21) Appl. No.: 17/039,826

(22) Filed: Sep. 30, 2020

(65) Prior Publication Data

US 2022/0101943 A1    Mar. 31, 2022

(51) Int. Cl.
| | |
|---|---|
| *G16B 5/20* | (2019.01) |
| *G16B 20/10* | (2019.01) |
| *G16B 20/20* | (2019.01) |
| *G16B 40/00* | (2019.01) |

(52) U.S. Cl.
CPC .............. *G16B 5/20* (2019.02); *G16B 20/10* (2019.02); *G16B 20/20* (2019.02); *G16B 40/00* (2019.02)

(58) Field of Classification Search
CPC .......... G16B 5/20; G16B 20/10; G16B 20/20; G16B 40/00
See application file for complete search history.

(56) References Cited

U.S. PATENT DOCUMENTS

| | | | |
|---|---|---|---|
| 9,092,401 | B2 | 7/2015 | Richards et al. |
| 9,309,556 | B2 | 4/2016 | Myllykangas et al. |
| 2014/0024541 | A1 | 1/2014 | Richards et al. |
| 2018/0163261 | A1* | 6/2018 | Zeigler ................... C12Q 1/68 |
| 2019/0220704 | A1* | 7/2019 | Schulz-Trieglaff .... G16B 20/20 |

(Continued)

OTHER PUBLICATIONS

Yuzhen Lu and Fathi M. Salem. Simplified Gating in Long Short-term Memory (LSTM) Recurrent Neural Networks. Conference: 2017 IEEE 60th International Midwest Symposium on Circuits and Systems (MWSCAS) (Year: 2017).*

(Continued)

*Primary Examiner* — Karlheinz R. Skowronek
*Assistant Examiner* — Mary C Leverett
(74) *Attorney, Agent, or Firm* — Foley & Lardner LLP

(57) ABSTRACT

A system and method for determining a respective carrier status of an individual is provided. In one implementation, a method includes training a neural network model based on predetermined information related to at least one genetic variant and determining the respective carrier status based on a normalized read depth for the gene in a genome of the individual and allele dosage data for the gene using a machine learning algorithm. The method is configured to receive, as inputs, the normalized read depth and allele dosage data, and output the respective carrier status of the individual for the at least one genetic variant. In another implementation a system includes a recurrent neural network. The recurrent neural network includes a plurality of long short-term memory (LSTM) network cells linked sequentially in the recurrent neural network, a plurality of layers of long short-term memory (LSTM) network cells; and a fully connected sigmoid module.

24 Claims, 11 Drawing Sheets

(56) References Cited

U.S. PATENT DOCUMENTS

2020/0251183 A1* 8/2020 Kashefhaghighi ..... G16B 40/20

OTHER PUBLICATIONS

Hryhorii Chereda et al. Utilizing Molecular Network Information via Graph Convolutional Neural Networks to Predict Metastatic Event in Breast Cancer. German Medical Data Sciences pp. 181-186 (Year: 2019).*

Akanksha Kavikondala et al. Automated Retraining of Machine Learning Models. International Journal of Innovative Technology and Exploring Engineering (IJITEE) ISSN: 2278-3075, vol. 8 Issue-12, Oct. 2019 (Year: 2019).*

Joe Kilian. The Dynamic Universality of Sigmoidal Neural Networks. Information and Computation 128, 48-56 (1996) article No. 0062 (Year: 1996).*

Lei Cai, Yufeng Wu and Jingyang Gao. DeepSV: accurate calling of genomic deletions from high-throughput sequencing data using deep convolutional neural network. BMC Bioinformatics (2019) 20:665 (Year: 2019).*

Zachary S. Bohannan, Antonina Mitrofanova. Calling Variants in the Clinic: Informed Variant Calling Decisions Based on Biological, Clinical, and Laboratory Variables. Computational and Structural Biotechnology Journal 17 (2019) 561-569 (Year: 2019).*

Kyriakou, A., Lucas-Herald, A. K., McGowan, R., Tobias, E. S., & Ahmed, S. F. (2015). Disorders of sex development: advances in genetic diagnosis and challenges in management. Advances in Genomics and Genetics, 165-177. (Year: 2015).*

Layer, Ryan M., et al. "Efficient genotype compression and analysis of large genetic-variation data sets." Nature methods 13.1 (2016): 63-65. (Year: 2016).*

Liu, Qian, et al. "Detection of DNA base modifications by deep recurrent neural network on Oxford Nanopore sequencing data." Nature communications 10.1 (2019): 2449. (Year: 2019).*

Hopmans et al., "A programmable method for massively parallel targeted sequencing", Nucleic Acids Research, Mar. 25, 2014, vol. 42, No. 10, pp. 1-16.

Myllykangas et al. "Efficient targeted resequencing of human germline and cancer genomes by oligonucleotide-selective sequencing", Nature Biotechnology, Oct. 23, 2011, vol. 29, No. 11, pp. 1024-1027.

* cited by examiner

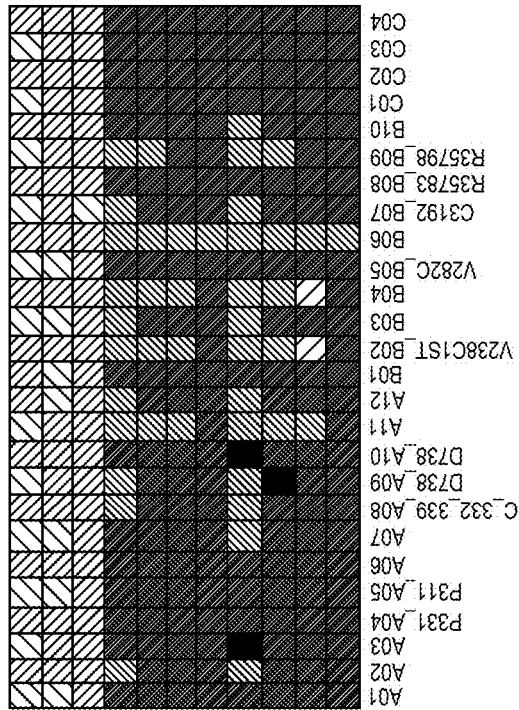
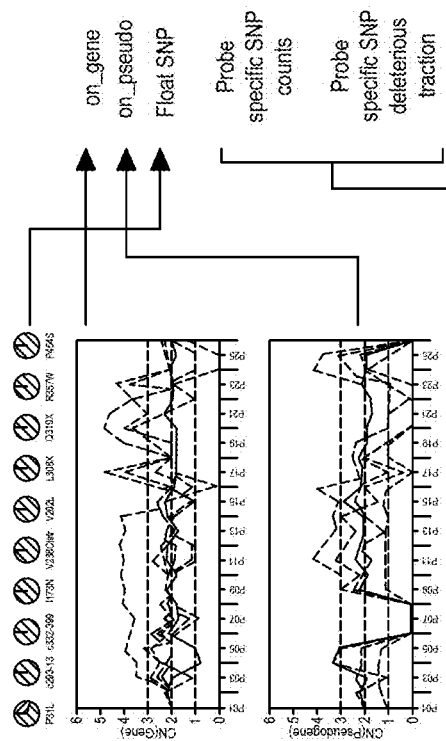
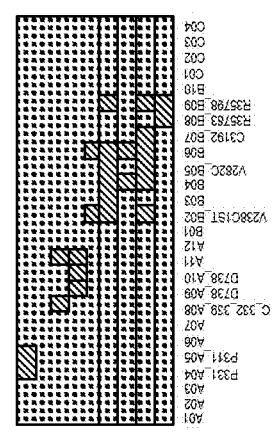
FIG. 3A
FIG. 3B
FIG. 3C

DEEP LEARNING BASED VARIANT CALLING USING MACHINE LEARNING

BACKGROUND a. Field

This disclosure relates generally to identifying a genetic condition from sequenced genomes (or portions of genomes).

b. Background

Certain genetic conditions can be associated with the number of functional copies of one or more genes and/or single nucleotide polymorphisms in an individual's genome. As such, identification of such genetic conditions can be accomplished using information about the above, and a method of determining such genetic conditions, while reducing the need for human involvement in making such determinations, is desirable.

The disclosures of all publications, patents, and patent applications referred to herein are each hereby incorporated by reference in their entireties. To the extent that any reference incorporated by reference conflicts with the instant disclosure, the instant disclosure shall control.

BRIEF SUMMARY

Various genetic conditions can be associated with an individual having fewer than two functional copies of a specific gene in their genome (e.g., for autosomal dominant conditions, such as Lynch syndrome), or an individual having fewer than one functional copy of a specific gene in their genome (e.g., for autosomal recessive conditions). For example, an individual's lack of a functional copy of the CYP21A2 gene can lead to the individual having congenital adrenal hyperplasia (CAH). Data relating to the number of copies of genetic material corresponding to the gene of interest in the individual's genome, and data relating to the number of sequencing reads from a location in the gene of interest in the individual's genome that have a single nucleotide polymorphism at that location can be used to determine whether the individual has two (or one, or none) functional copies of the gene of interest and/or the nature of mutations in the gene of interest, if any. The examples of the disclosure provide various ways in which a machine learning system can be used to make such determinations based on sequencing data such as from genetic experiments.

BRIEF DESCRIPTION OF THE DRAWINGS

FIG. 3A illustrates an example CAH plot adapted to be used for variant calling review according to examples of the disclosure.

FIG. 3B illustrates an example heat map plot showing probe-specific SNP contribution for the example CAH plot shown in FIG. 3A according to examples of the disclosure.

FIG. 3C illustrates a deep learning CAH feature matrix adapted to be used by a deep learning-based variant calling machine learning system according to one or more examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various genetic conditions can be associated with an individual having fewer than two functional copies of a specific gene in their genome (e.g., for autosomal dominant conditions, such as Lynch syndrome), or an individual having fewer than one functional copy of a specific gene in their genome (e.g., for autosomal recessive conditions). For example, an individual's lack of a functional copy of the CYP21A2 gene can lead to the individual having congenital adrenal hyperplasia (CAH). Data relating to the number of copies of genetic material corresponding to the gene of interest in the individual's genome, and data relating to the number of sequencing reads from a location in the gene of interest in the individual's genome that have a single nucleotide polymorphism at that location can be used to determine whether the individual has two (or one, or none) functional copies of the gene of interest and/or the nature of mutations in the gene of interest, if any. The examples of the disclosure provide various ways in which a machine learning algorithm can be used to make such determinations.

Figure 1:
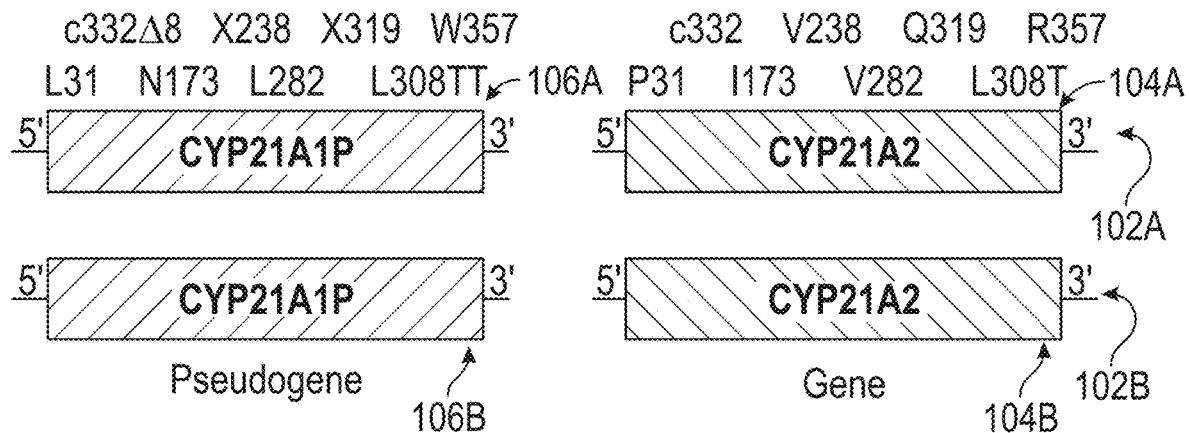
FIG. 1 illustrates the existence of an exemplary gene and pseudogene in the genome (or a portion of the genome) of a healthy human according to examples of the disclosure.

FIG. 1 illustrates the existence of an exemplary gene and pseudogene in the genome (or a portion of the genome) of a healthy human according to examples of the disclosure. Specifically, as mentioned above, a healthy human generally has two functional copies of a given gene—one copy on a maternal chromosome and one copy on a paternal chromosome. The individual also generally includes a maternal copy and a paternal copy of a pseudogene corresponding to the gene of interest, where the gene and the pseudogene can have coding regions that are on the order of 95% identical or more (e.g., 96%, 97%, 98%, or 99% or more) within the exon coding region. Thus, as shown in FIG. 1, a healthy human can have chromosome 102A and chromosome 102B, where chromosome 102A includes the gene of interest 104A and a corresponding pseudogene 106A, and chromosome 102B also includes the gene of interest 104B and a corresponding pseudogene 106B. Although FIG. 1 indicates the gene of interest and the corresponding pseudogene on the same chromosome, it is understood that, for certain gene/pseudogene pairs, the gene and the corresponding pseudogene are on different chromosomes (e.g., SDHA). In the example of FIG. 1, the gene of interest is a CYP21A2 gene, which has a corresponding CYP21A1P pseudogene. While some of the examples of the disclosure are described with reference to the CYP21A2 gene and the CYP21A1P pseudogene, it is understood that the techniques of the disclosure can also apply to other gene-pseudogene pairs. Some exemplary gene-pseudogene pairs, and associated genetic conditions, include: 1) CYP21A2 (gene) and CYP21A1P (pseudogene) associated with CAH; 2) GBA (gene) and psGBA (pseudogene) associated with Gaucher disease; 3) PMS2 (gene) and PMS2CL (pseudogene) associated with Lynch Syndrome; and 4) SMN1 (gene) and SMN2 (pseudogene) associated with spinal muscular atrophy.

If an individual does not have the requisite number (e.g., two or one) of functional copies of the gene of interest (e.g., genes 104A and 104B), that individual may exhibit any of several inherited genetic conditions. For example, in reference to the CYP21A2 gene, the individual's lack of at least one functional copies of that gene can lead to the individual having congenital adrenal hyperplasia (CAH). Furthermore, the presence of only a single functional copy of the CYP21A2 gene indicates that this person is a carrier. If two carriers of an autosomal recessive condition have a child, the child has a 25% chance of inheriting zero functional copies and thus being affected. Thus, it can be beneficial to accurately determine whether an individual does not have two functional copies of the gene of interest so as to be able to diagnose that individual as carrying a corresponding genetic condition. Specifically, the examples of the disclosure can be used to identify any one or more of the following: two functional copies of the gene of interest; one functional copy of the gene of interest, one non-functional copy of the gene of interest (e.g., due to a mutation at one or more locations in the gene); less than two copies of the gene of interest (e.g., only one copy of the gene of interest) and/or whether those copies are functional or non-functional; more than two copies of the gene of interest (e.g., three copies of the gene of interest) and/or whether those copies are functional or non-functional, etc. Further, it is understood that while some of the examples of the disclosure are provided in the context of determining whether an individual has CAH by determining one or more characteristics of the individual's CYP21A2 genes, the examples of the disclosure can be used to diagnose other genetic conditions related to other genes (and/or pseudogenes) in analogous manners, as mentioned above.

In some examples, whether an individual has two functional copies of the gene of interest (e.g., the CYP21A2 gene) can be determined using "copy number data" and allele variant data, such as but not limited to "single nucleotide polymorphism (SNP) data," indel data, duplication data or deletion data, relating to the gene of interest and/or the corresponding pseudogene (e.g., the CYP21A1P pseudogene) in the individual's genome. In some examples of the disclosure, allele variant data (e.g., "SNP data" or other data) can be data associated with a given location in the gene and/or the pseudogene of interest that is indicative of the number of sequencing reads from a sample that have a deleterious SNP (relative to a reference genome, a reference portion of the genome or a reference sequence) at that location. For example, the SNP data can be a ratio of the number of sequencing reads that detected a SNP at that location to the number of sequencing reads that did not detect a SNP at that location, or a ratio of the number of sequencing reads that detected a SNP at that location to the total number of sequencing reads obtained at that location (whether or not those reads detected a SNP at that location). In some examples, the SNP data can be count data and/or fraction data indicative of the relative abundance of the wild type versus mutant base at each locus, and in some examples, and in some examples can also include SNP call data that can be binary (e.g., indicating that a particular location is wild type or mutant) or descriptive (e.g., indicating that a particular location has a particular nucleotide). In some examples of the disclosure, "copy number data" can be data that indicates the number of copies of genetic material corresponding to the gene of interest and/or the corresponding pseudogene that are detected, on average, during sequencing of the individual's genome at various locations (e.g., single base pair locations or regions, such as clusters of base pairs) in the genome.

Figure 2A:
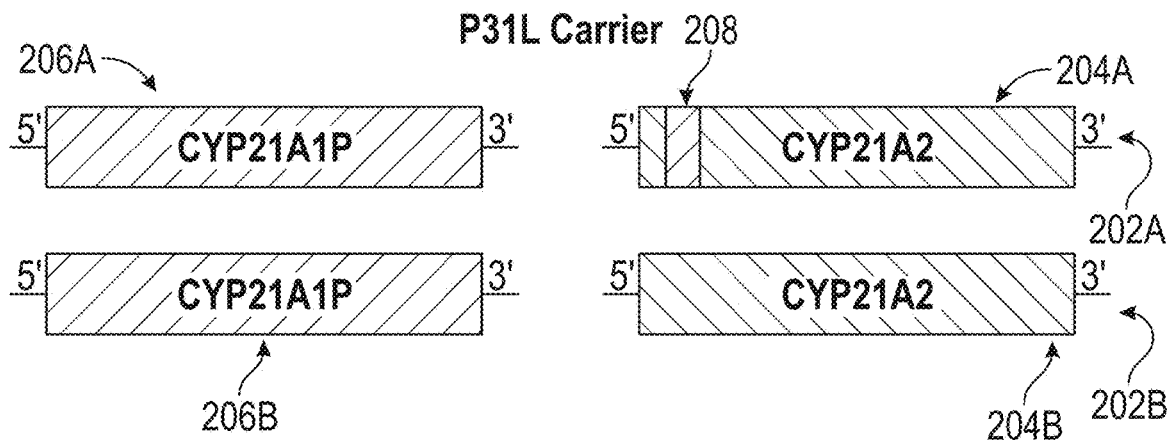
FIG. 2A illustrates a scenario in which an individual does not have two functional copies of the gene of interest (e.g., CYP21A2 gene) according to examples of the disclosure.

FIG. 2A illustrates a scenario in which an individual does not have two functional copies of the gene of interest (e.g., CYP21A2 gene) according to examples of the disclosure. Specifically, this individual has a normal copy of the CYP21A2 gene 204B and a copy of the CYP21A1P pseudogene 206B in chromosome 202B; however, the CYP21A2 gene 204A in chromosome 202A has a mutation at location 208 in the CYP21A2 gene 204A that results in the genomic sample being a P31L carrier, and thus a potential cause for CAH. Identification of this fact (e.g., one functional copy of the gene of interest and one non-functional copy of the gene of interest) can be accomplished pursuant to the examples of the disclosure, as will be described below.

Figure 2B:
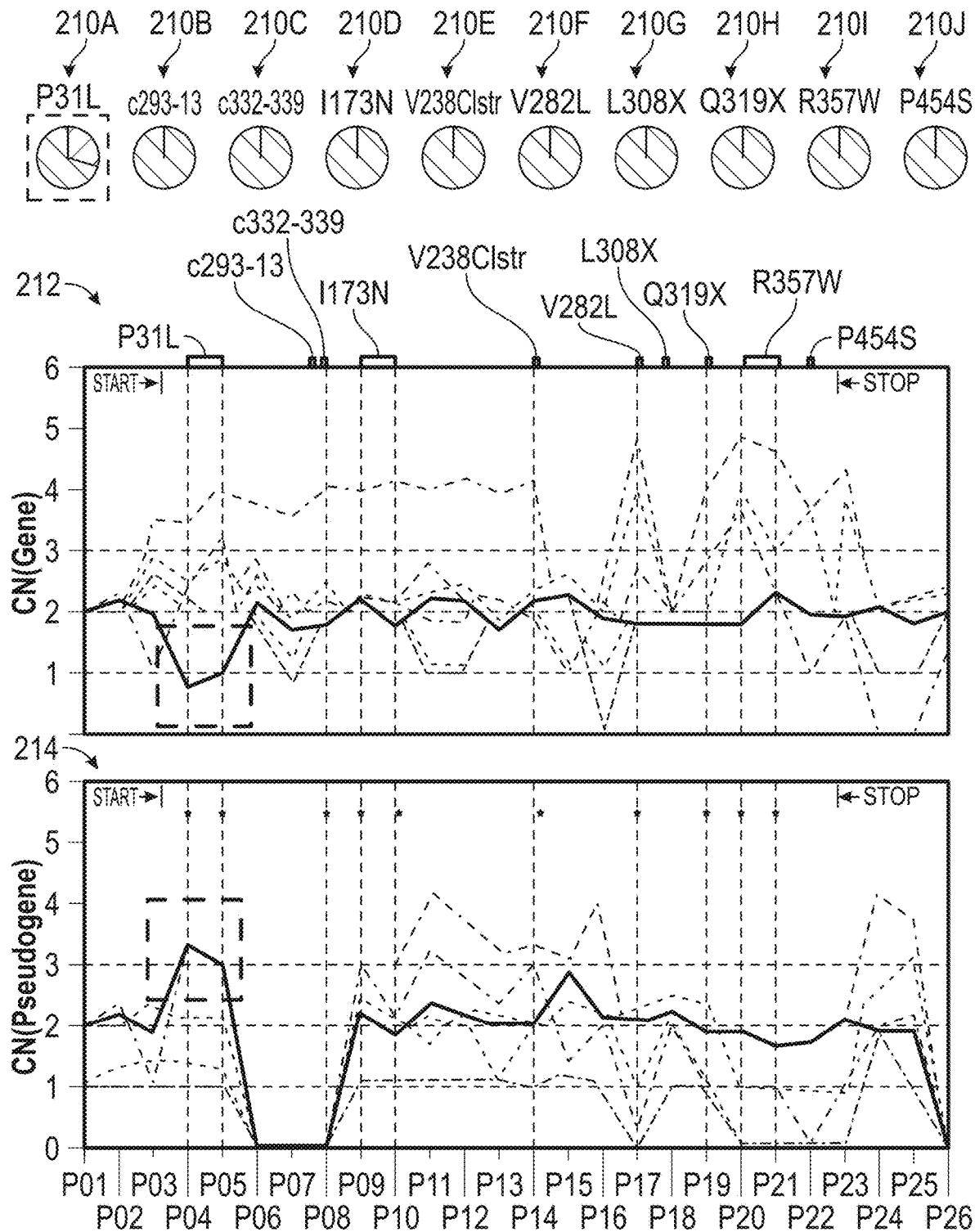
FIG. 2B illustrates example copy number data and SNP data that might be obtained by sequencing a gene and pseudogene of the individual corresponding to the sample discussed in FIG. 2A.
Figure 2C:
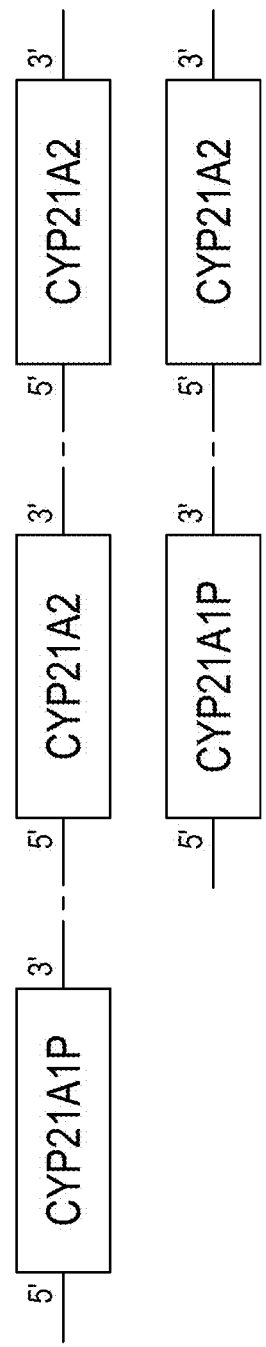
FIG. 2C illustrates a representation of a Q319+duplication haplotype wherein one chromosome contains both a duplication of CYP21A2 and a Q319X variant such that the chromosome still contains one functional copy of the CYP21A2 gene.

FIG. 2C illustrates a representation of a Q319+duplication haplotype wherein one chromosome contains both a duplication of CYP21A2 and a Q319X variant such that the chromosome still contains one functional copy of the CYP21A2 gene.

FIG. 2B illustrates example copy number data and SNP data that might be obtained by sequencing a gene and pseudogene of the individual corresponding to the sample discussed in FIG. 2A. It is understood that the copy number data and the SNP data can be obtained using any suitable genetic sequencing methodology, such as whole genome sequencing (e.g., for SNP and/or copy number data), targeted sequencing with biotin capture (e.g., for SNP and/or copy number data), MLPA (e.g., for copy number data) and targeted genotyping (e.g., for SNP data). In some examples, the copy number data and the SNP data can be obtained using direct targeted sequencing (DTS). Direct targeted sequencing uses a capture probe library comprising a plurality of capture probes that hybridize to nucleic acid molecules in the sequencing library. The capture probes are designed to hybridize to segments within the region of interest (e.g., the gene and/or pseudogene of interest), and each capture probe has a corresponding segment. The region of interest is therefore determined by the capture probes used to enrich the sequencing library. The capture probes are extended using the nucleic acid molecules hybridized to the capture probe as a template. The extended capture probe can then be sequenced to obtain the sequence of a portion (that is, the portion corresponding to the segment from the region of interest) of the nucleic acid molecule. Because the sequence of the capture probe itself is determined, the segment corresponding to the capture probe begins following the terminus of the capture probe. In some embodiments, the extended capture probe is amplified to obtain additional copies. Amplification of the extended capture probe can also introduce artifacts in the sequencing depth, which can be normalized. U.S. Pat. No. 9,309,556, entitled "Direct Capture, Amplification and Sequencing of Target DNA using Immobilized Primers"; U.S. Pat. No. 9,092,401, entitled "System and Method for Detecting Genetic Variation"; U.S. Patent App. No. 2014/0024541, entitled "Methods and Compositions for High-throughput Screening"; Myllykangas et al. "Efficient targeted resequencing of human germline and cancer genomes by oligonucleotide-selective sequencing G Nat Biotechnol. 29(11): 1024-7 (2011); and Hopmans et al, "A programmable method for massively parallel targeted sequencing." Nucleic Acids Res. 42(10):e88 (2014) describe embodiments of direct targeted sequencing. Direct targeted sequencing need not be performed using surface-based methods, but can also be performed in solution.

Referring again to FIG. 2B, the sequencing data can include SNP data 210 corresponding to the gene of interest (e.g., CYP21A2) (and/or in some examples, the corresponding pseudogene (e.g., CYP21A1P)), copy number data 212 corresponding to the gene of interest and copy number data 214 corresponding to the corresponding pseudogene 214. In the context of the CYP21A2 gene and the CYP21A1P pseudogene (understanding that the below description would apply analogously to other gene/pseudogene pairs of interest), SNP data 210 can include SNP data for various predetermined locations within the CYP21A2 gene and/or the CYP21A1P pseudogene. In some examples, these predetermined locations can be locations in the CYP21A2 gene and/or the CYP21A1P pseudogene that are known to be associated with particular genetic conditions (e.g., P31L carrier, I173N carrier, Q319X carrier, etc.). For example, SNP data 210A can be SNP data corresponding to location 208 in the CYP21A2 gene (e.g., as shown in FIG. 2A) and/or the CYP21A1P pseudogene where the existence of a SNP can result in the genomic sample being a P31L carrier. The SNP data 210 can include additional SNP data (e.g., data 210B, 210C, etc.) from other locations (e.g., different and/or unique locations) within the gene and/or the pseudogene of interest that are associated with particular genetic conditions. As previously mentioned, in some examples, the SNP data associated with a given location in the gene and/or the pseudogene of interest can be indicative of the number of samples sequenced that have a SNP at that location. For example, the SNP data can be a ratio of the number of sequencing reads that detected a SNP at that location to the number of sequencing reads that did not detect a SNP at that location, or a ratio of the number of sequencing reads that detected a SNP at that location to the total number of sequencing reads obtained at that location (whether or not those reads detected a SNP at that location).

Copy number data 212 and 214 can indicate the number of copies of one or more segments of the CYP21A2 gene and/or the CYP21A1P pseudogene. The line plots in copy number data 212 and 214 can correspond to copy number data for the individual of interest. In some examples, copy number data for other patients can be used to assess the significance of the copy number data variation of one patient (e.g., the individual of interest) as compared to the noise level of typical samples on that flow cell (e.g., used as data against which the copy number data for the current sample is validated). The segments of the CYP21A2 gene and/or the CYP21A1P pseudogene to which copy number data 212 and 214 correspond can correspond to a specific genetic locus (e.g., a single base) or can correspond to a sequencing read arising from a probe targeted to a region of the gene or pseudogene. For example, in some examples, one or more sequencing probes can be used to sequence the genome at different positions within the CYP21A2 gene and/or the CYP21A1P pseudogene to obtain copy number data corresponding to given positions in those genes/pseudogenes. Because a given sequencing run can include noise from various sources (e.g., probes, DNA, etc.), the sequencing can be normalized based on GC content, read mappability to a reference genome, performance of other samples in a multiplexed sequencing run, or any other normalization method known in the art. In some examples, copy number data and/or SNP data for a given location can be determined from a reading of a single probe corresponding to that location, or from readings of multiple probes at different locations to create normalized copy number and/or SNP data for that given location. In some examples, copy number data 212 and 214 can be determined based on counts of probe reads of pair-end sequencing that are normalized within the sample, and across the sample, to give the copy number at each probe binding site. For example, in the example of FIG. 2B, the number of copies of CYP21A2 genetic material detected at the position corresponding to probe P01 can be 2, the number of copies of CYP21A2 genetic material detected at the position corresponding to probe P02 can be slightly more than 2 (e.g., 2.3), the number of copies of CYP21A2 genetic material detected at the position corresponding to probe P03 can be slightly more than 2 (e.g., 2.1), etc. However, in the case that the genome being sequenced corresponds to a P31L carrier, it can be the case that the number of copies of CYP21A2 genetic material detected at the positions corresponding to probes P04 and P05 can be substantially less than 2 (e.g., closer to 1, because the individual can be missing one copy of that gene segment at those positions within the gene or pseudogene). Correspondingly, it can be the case that the average number of copies of CYP21A1P genetic material detected at the positions corresponding to probes P04 and P05 can be substantially more than 2 (e.g., closer to 3, even above 3 as in FIG. 2B, because the individual can have an extra copy of that genetic material at those positions in their genome). In some examples, copy number data for the gene can be differentiated from copy number data for the pseudogene based on one or more base pairs of one or more probes (e.g., the 40-th base pair of the 39-mer probes). For example, if a probe terminates at position N−1 and the extended probe is sequenced to include position N, the base sequenced at position N can determine whether the copy number count for a given probe arises from the gene or pseudogene based on the expected base at position N. In some examples, the positions of the genome sequenced by the sequencing probes can be the same as the positions to which the SNP data 210 correspond, can be different than the positions to which the SNP data 210 correspond, and/or can be overlapping with the positions to which the SNP data 210 correspond (e.g., can include some of the same positions, and some different positions). In some examples, copy number data for one or more probes (e.g., locations) may only be available for one of the gene and the pseudogene—thus, copy number data for the other of the gene and the pseudogene at those probes (e.g., locations) may be zero or non-existent (e.g., as at probes P06, P07 and P08 in FIG. 2B).

The above-described SNP and copy number data can be obtained from a genomic sample of interest with the goal of determining the carrier status of the individual from which the genomic sample was collected, as described above. Different carrier statuses can be associated with different copy number and/or SNP data. For example, in the context of the CYP21A2 gene and the CYP21A1P pseudogene, P31L carrier status can be associated with the SNP and copy number data described with reference to FIGS. 2A-2B. Other carrier statuses (e.g., indications of the existence of one or more given genetic conditions) can be associated with different SNP and copy number data for the CYP21A2-CYP21A1P gene-pseudogene pair, or for other gene-pseudogene pairs of interest.

According to examples of the disclosure, machine learning algorithms can be used to receive as inputs SNP and/or copy number data, as described above, and output determinations relating to whether or not the sequenced genome is associated with one or more genetic conditions (e.g., output information about one or more carrier statuses of the individual). Some of the machine learning algorithms that can be used in accordance with the examples of the disclosure can be convolutional neural networks (CNNs) (e.g., which can be effective, because genetic data can be spatially correlated), support vector machines (SVMs), random forest, etc. Because DNA, and thus genes and pseudogenes of interest, can have a sequential character, recurrent neural networks (RNNs) can be especially conducive for use in such applications, because RNNs make use of sequential information in their operation in that the output of a RNN for a given element in a sequence depends on the operations of the RNN during the previous one or more elements in the sequence—such operation that is grounded in sequential operations aligns with the sequential character of DNA. Exemplary uses of RNNs to identify carrier statuses of sequenced genomes will now be described.

FIG. 3A illustrates an example CAH plot adapted to be used for variant calling review according to examples of the disclosure. In this example, a plurality of pie charts located in a top panel show a deleterious fraction of SNP data. A middle panel shows a graphical representation of a CN_gene, and a bottom panel shows a graphical representation of a CN_pseudo gene. The particular genes shown are merely an example, and other genes may be represented in a similar manner.

FIG. 3B illustrates an example heat map plot showing probe-specific SNP contribution for the example CAH plot shown in FIG. 3A according to examples of the disclosure. Darker red colored boxes represent a higher deleterious SNP fraction. Numbers in the plot indicate total read counts.

FIG. 3C illustrates a deep learning CAH feature matrix adapted to be used by a deep learning-based variant calling machine learning system according to one or more examples of the disclosure. In this particular example, an X-axis shows 26 individual probe locations, although any number of probe locations may be represented depending upon a particular application. A Y-axis indicates different features. As described below, a feature matrix, such as shown in FIG. 3C is fed into a deep learning-based variant calling module to be analyzed.

Figure 4:
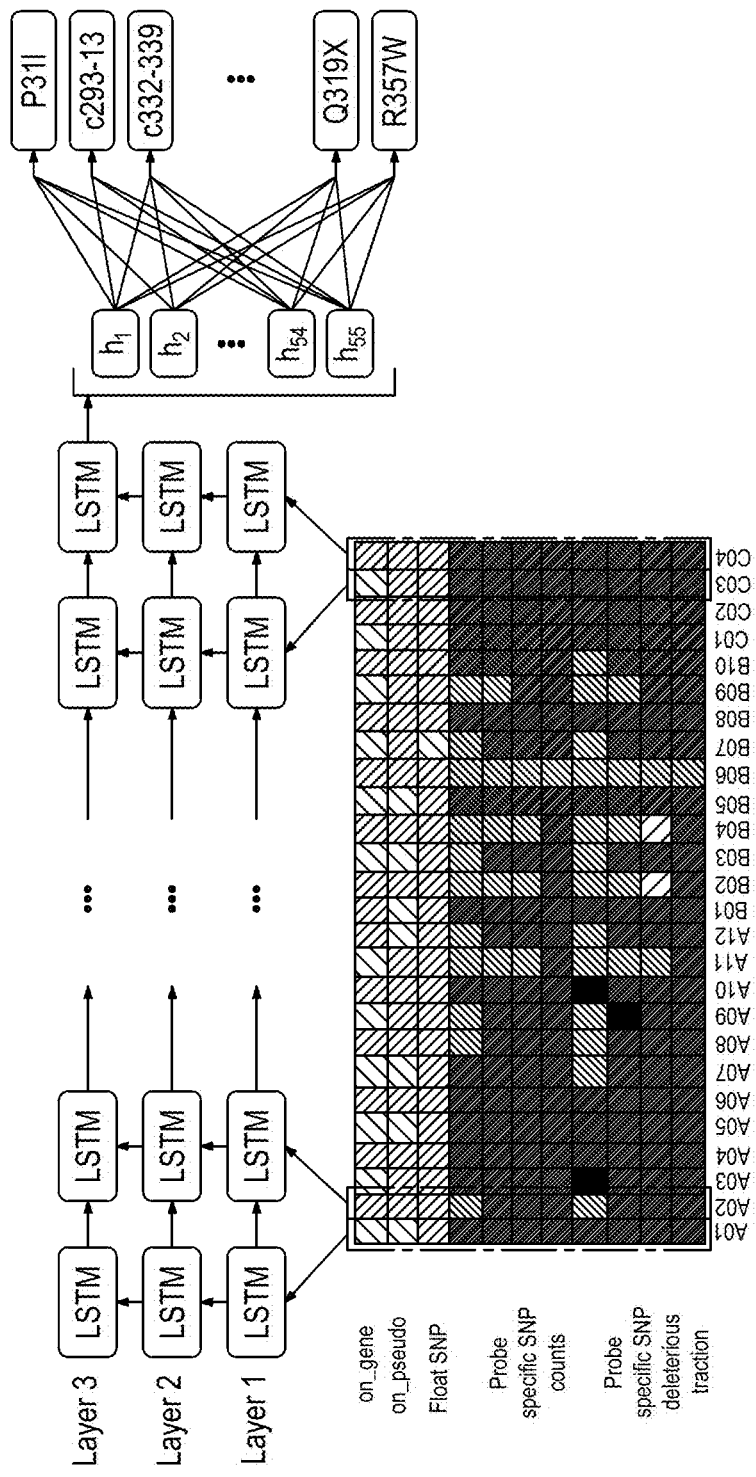
FIG. 4 is a schematic diagram illustrating an example architecture of a deep learning-based variant calling module according to one or more examples of the disclosure.

FIG. 4 is a schematic diagram illustrating an example system architecture of a deep learning-based variant calling module according to one or more examples of the disclosure. In the example shown in FIG. 4, the system architecture comprises a plurality of layers of a long short-term memory (LSTM) network, with a fully connected output layer. An LSTM network is a type of recurrent neural network (RNN) adapted to preserve long-term memory. LSTM cells have an input (i), forget (f), gate (g), and output (o) gates, which control an information flow. Weights (W) of the gates are learned through training. LSTM networks are particularly adept at modeling sequential data such as found in the genome (e.g., sequential CAH data). The four gates of an LSTM network can be expressed in the following equations:

$$i = \sigma\_(W_{ix}x_t + W_{ih}h_{t-1})$$

$$f = \sigma\_(W_{fx}x_t + W_{fh}h_{t-1})$$

$$o = \sigma\_(W_{ox}x_t + W_{oh}h_{t-1})$$

$$g = \tanh(W_{gx}x_t + W_{gh}h_{t-1}),$$

A cell state (c) at time, t, is updated to be the following:

$$c^l_t = i * g + f * c^l_{t-1}.$$

The hidden state (h) at time, t, is updated to be the following:

$$h^l_t = o * \tanh(c^l_t),$$

in which l is an index for a layer, t is an index for a time point, * denotes element-wise multiplication, σ denotes a sigmoid function.

In one example, an LSTM model receives CAH features sequentially along the genome. A feature matrix is constructed so that a feature vector corresponding to a probe (CN_gene, CN_pseudo, deleterious SNP fraction, etc.) can be fed into the LSTM at one time point of the LSTM as shown in FIG. 4. A maximum time (max_time) of an LSTM_mat_seq model in this example is a number of probes being used. The dimension of hidden and cell units can correspond to a number of features fed in at a certain time point. Feature vectors can be stacked up to increase the dimension of hidden and cell units.

A list of variants that may be called are shown after the fully connected output layer.

In one particular example, cross-entropy is used as a loss function in training of a deep learning-based variant calling module. As deleterious CAH mutations are much less frequent compared to WT, and the data set may have poor class balance. To account for class imbalance, a model may be penalized more for misclassifying a relatively rarer variant. In this example, a weighted loss function can be expressed in the following equation:

$$L = -\frac{1}{N} \sum_{i=1}^{N} \sum_{j=1}^{M} [C_j y_{ij} \log \hat{y}_{ij} + (1 - y_{ij}) \log(1 - \hat{y}_{ij})]$$

i: the index for samples
j: the index for variants
$y_{ij}$: the true label of a sample i for the variant j
$C_{ij}$: the variant weight to compensate for class imbalance
A variant weight can be calculated using the following equation:

$$C_j = \text{positive oversampling coefficient for variant } j = \frac{\text{number of negative examples, variant } j}{\text{number of positive examples, variant } j}$$

The system may also employ an optimization operation, such as an ADAM optimizer which can be employed a deep learning-based variant calling module. In this particular example, the ADAM optimizer can adapt learning rates based on the first and second gradient momentum (Kingma et al. ICLR 2015).

$$\theta_{t+1} = \theta_t - \frac{\eta}{\sqrt{\hat{v}_t} + \epsilon} \hat{m}_t$$

$\eta$: the learning rate
$\hat{m}_t$: the unbiased first moment of a gradient
$\hat{v}_t$: the unbiased first moment of a gradient
$\epsilon$: a small number As shown in the example below, a deep learning variant calling module can provide a strong performance (e.g., achieving 99.99% accuracy), and can be able to accurately call variants that would have needed to be overridden by human reviewers in other systems. However, a confidence model may be used to reflect a varying degree of confidence in a model performance for each variant called.

In one particular example, an f1 score may be used as a measure for variant confidence. In this example, positive samples are rare, and it can be relatively easy to achieve high specificity (TN/(TN+FP)). In contrast, precision (TP/(TP+FP)) and recall (TP/(TP+FN)) are dependent on the performance with positive samples. Small mistakes on positives can have large impacts on precision and recall. Thus, an f1 score (the harmonic mean of precision and recall) can be selected as a measure for performance for each variant.

Additionally, the f1 score can be scaled as a function of the number of positives available on test sets, as the performance of the model in each variant is highly dependent on the number of training samples available. For example, if there is one positive sample in the test set, and if the model makes a correct inference, then the precision, recall, and f1 scores are all 1, which is misleading. To reflect the limited number of positives, a Bayesian approach may be employed. A flat Beta (1,1) is selected, and posterior precision, recall, and f1 are calculated. If the deep learning variant calling module makes an accurate call on a variant with just one positive sample, then posterior precision, recall, and f1 scores can be moderated down (e.g., to ⅔).

$$\text{posterior precision} = \text{Beta}(TP+1, FP+1)$$

$$\text{posterior recall} = \text{Beta}(TP+1, FN+1)$$

$$\text{posterior } f1 = \frac{2 * \text{posterior precision} * \text{posterior recall}}{\text{posterior precision} + \text{posterior recall}}$$

Posterior f1 scores can be calculated for each variant and are then used to adjust probability on each sample.

Posterior f1 score of each variant j:

$$f1_j \in [0,1]$$

Probability of a sample i for being positive for a variant j:

$$p_{ij} \in [0,1]$$

The adjusted probability based on posterior f1 score $\pi_{ij}$:

$$\pi_{ij} = f1_j * (p_{ij} - 0.5) + 0.5$$

Then adjusted probability, $\pi_{ij}$, can be stratified to give five categories of calls as follows:
[0, 0.05) confident_negative
[0.05, 0.2) negative
[0.2, 0.8] no_inference
(0.8, 0.95] positive
(01.95, 1.0] confident_positive The adjusted probability reflects confidence of the model for each variant (See FIG. 5). In the case of L308X, for which the model failed to correctly classify one positive sample in the test set, the posterior f1 score is 0.4. Then the original probability of being positive, 0 and 1, is adjusted to 0.3 and 0.7, respectively. Therefore, the INFERENCE category for L308X is "no inference" in this example. The adjusted probability of the variants with low posterior f1 scores (c332-339, V238C1str, P31L and R357W) can be moderated so that possible INFERENCE categories are positive, no inference, or negative. In the case of the variants with high posterior f1 scores (c293-13, I173N, P454S, Q319X_dup_cis, Q319X and V282L), adjusted probability is not very different from the original probability. Samples may have any of the five categories of the INFERENCE for these variants.

Figure 5:
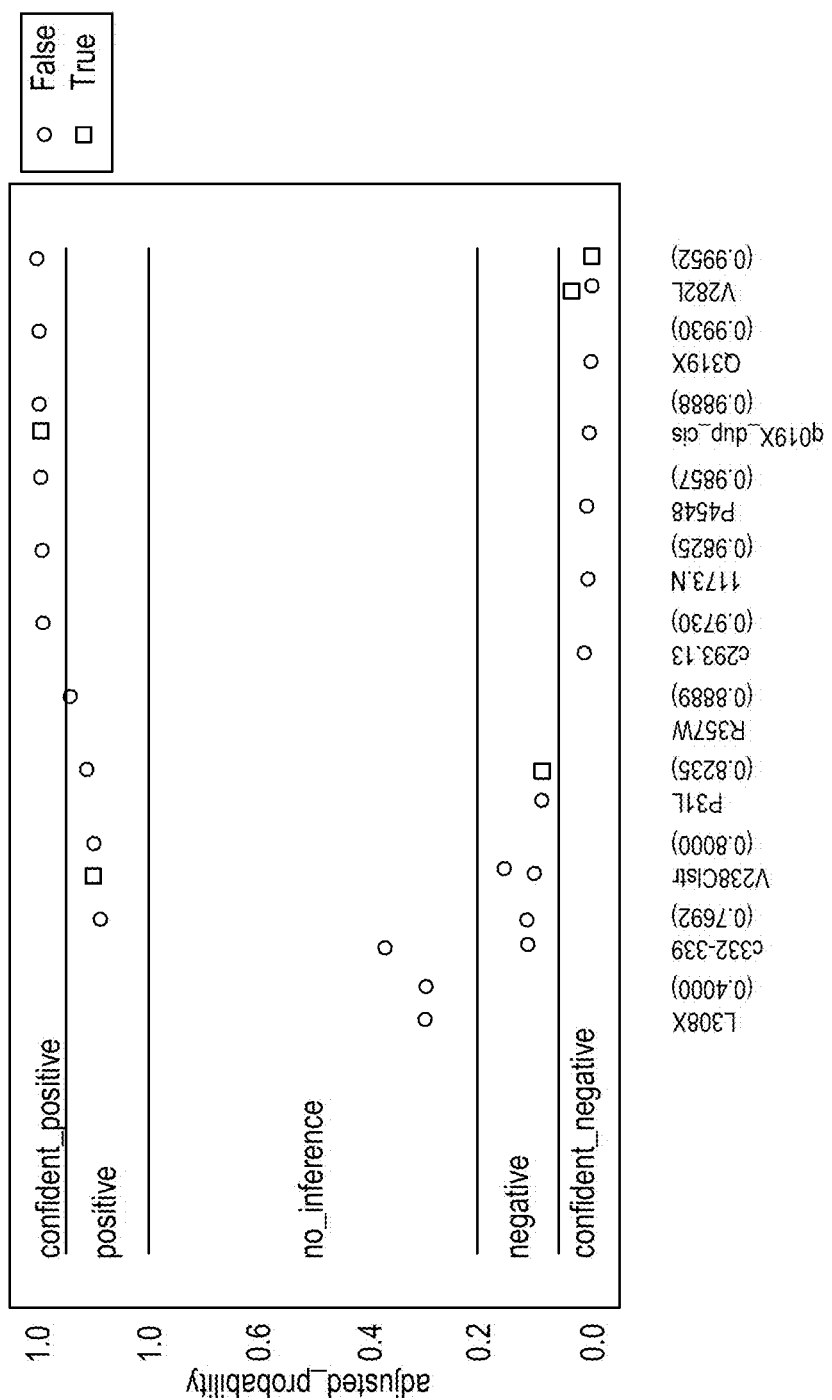
FIG. 5 illustrates an example graphical representation of an adjusted probability and categories of a deep learning-based variant calling module inference according to one or more examples of the disclosure.

FIG. 5 illustrates an example graphical representation of an adjusted probability and categories of a deep learning-based variant calling module inference according to one or more examples of the disclosure. In this example, variants are sorted based on their posterior f1 score along the X-axis. "True/False" labels represent whether the sample is positive for a variant based on final human-reviewed call.

Figure 6A:
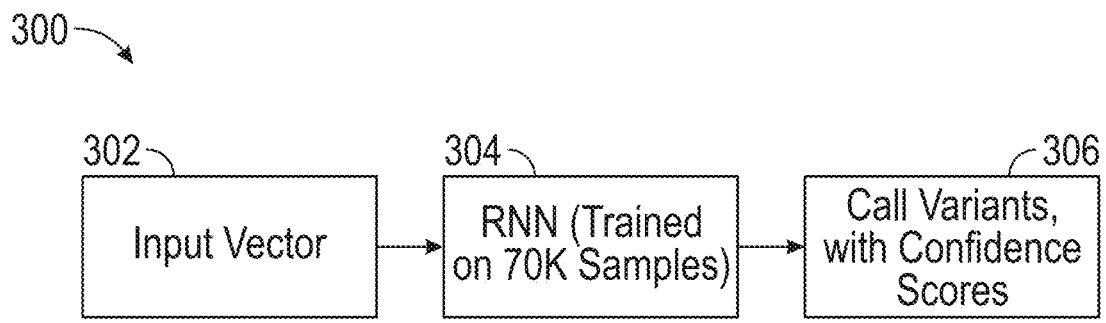
FIG. 6A illustrates an exemplary process in which an RNN can be used to determine one or more carrier statuses associated with the genome (or portion of the genome) being sequenced according to examples of the disclosure.

FIG. 6A illustrates an exemplary process in which an RNN can be used to determine one or more carrier statuses associated with the genome (or portion of the genome) being sequenced according to examples of the disclosure.

FIG. 6A illustrates an exemplary process 300 in which an RNN can be used to determine one or more carrier statuses associated with the genome (or portion of the genome) being sequenced according to examples of the disclosure. Input vector 302 can correspond to SNP and/or copy number data for that genome, as described above. Input vector 302 can be inputted to RNN 304 that has been trained with SNP and copy number data, and corresponding carrier status determinations, to output variant calls and/or confidence scores at 306. The SNP and copy number data, and the carrier status determinations, used to train RNN 304 can include SNP and copy number data from previously sequenced samples, and can include data from samples that are known carriers for the one or more genetic conditions RNN 304 is being trained to identify, data from samples that are known non-carriers for the one or more genetic conditions RNN 304 is being trained to identify, or a mixture of both known carriers and known non-carriers for the one or more genetic conditions RNN 304 is being trained to identify. Further, the known carrier statuses of those previously sequenced samples can be used to train RNN 304 to be able to connect SNP and copy number data with carrier statuses. Variant calls (provided in 306) in this context can be indications of whether or not the RNN 304 determines that the sample being sequenced is associated with one or more genetic conditions (e.g., CAH) or carrier statuses. Further, in some examples, RNN 304 can output, along with the variant calls themselves, indications of the confidence with which those variant calls are made as described herein. Exemplary details of input vector 302, RNN 304 and variant calls 306 will be described later with reference to FIGS. 7A-7B and 8. Exemplary details of training data used to train RNN 304 will also be described later.

Figure 6B:
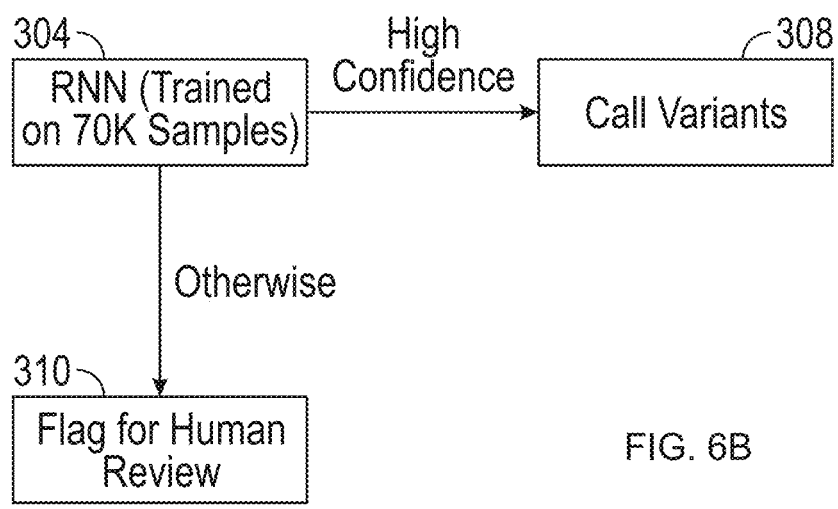
FIG. 6B illustrates an alternative flow for the process of FIG. 4A in which an RNN only outputs variant calls if those calls are associated with relatively high confidence levels according to examples of the disclosure.

FIG. 6B illustrates an alternative flow for the process of FIG. 4A in which an RNN only outputs variant calls if those calls are associated with relatively high confidence levels according to examples of the disclosure.

FIG. 6B illustrates an alternative flow for process 300 in which RNN 304 only outputs variant calls 308 if those calls are associated with relatively high confidence levels (e.g., confidence levels greater than a threshold confidence level, such as 0.8, 0.9 or 1.0 in the case of a statistical confidence model) according to examples of the disclosure. Specifically, if RNN 304 is able to produce variant calls 308 at such a high confidence level, then it outputs those variant calls at 308 (e.g., inserted into a patient report to be sent to the patient with minimal additional review). However, if RNN 304 is not able to produce variant calls 308 at such a high confidence level (e.g., the confidence level is less than or equal to the above threshold confidence level), then RNN 304 does not output variant calls 308; rather, the SNP data, copy number data, variant calls and/or confidence levels are flagged for review (e.g., flagged for detailed human review and/or put into a non-RNN-based variant calling and review process, without being inserted into a patient report) at 310.

Figure 6C:
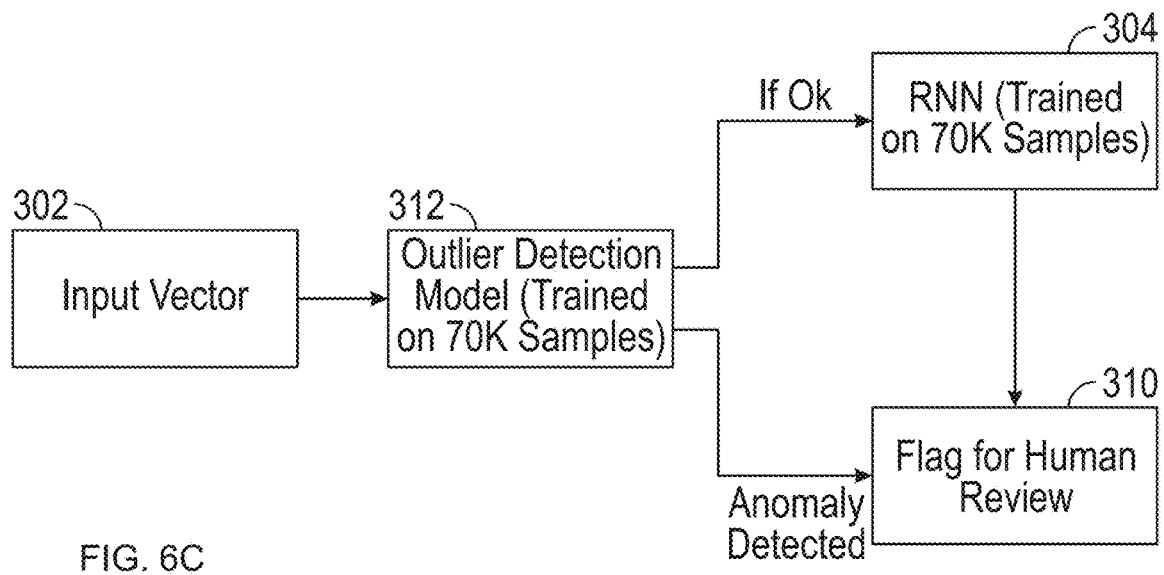
FIG. 6C illustrates an exemplary process in which anomaly detection is used before data is inputted to an RNN for determining one or more carrier statuses associated with the genome being sequenced according to examples of the disclosure.

In some examples, it can be beneficial to only input SNP and copy number data for a genome being sequenced to RNN 304 if that data is not considered to be outlier data (e.g., data in which one or more anomalies are detected). Anomalies in CYP21A2 might include noisy sequencing data or uncommon forms of genetic variation. FIG. 6C illustrates an exemplary process 301 in which anomaly detection is used before data is inputted to RNN 304 for determining one or more carrier statuses associated with the genome (or portion of the genome) being sequenced according to examples of the disclosure. Input vector 302 can be inputted to anomaly detection model 312. If anomaly detection model 312 determines that the data in input vector 302 is not anomalous, then that input vector 302 can be inputted to RNN 304. If, however, anomaly detection model 312 determines that the data in input vector 302 is anomalous, then the SNP data, copy number data, variant calls and/or confidence levels can be flagged for review (e.g., flagged for human review) at 310, without inputting vector 302 to RNN 304. In some examples, anomaly detection model 312 can determine that a given set of data is anomalous if it corresponds to one or more variant calls (e.g., carrier status determinations) that required human review and/or override, because a calling algorithm (e.g., carrier status determination algorithm) that is not based on the machine learning algorithms of the disclosure (e.g., one used for production samples, such as a variant calling algorithm that uses base counting and a log-odds ratio threshold to classify variants, or a variant calling algorithm based on manual review of the sequencing data) was not able to produce a confident call (e.g., carrier status determination), or produced an inaccurate call (e.g., carrier status determination). In some embodiments, anomaly detection model 312 comprises a machine learning algorithm (e.g., a support vector machine) that is trained to predict whether a sample will be "overridden" in call review. For example, given inputs of the same SNP data and copy number data, the anomaly detection model 312 can learn to predict whether a sample is likely to be "overridden", and is thus anomalous.

Figure 6D:
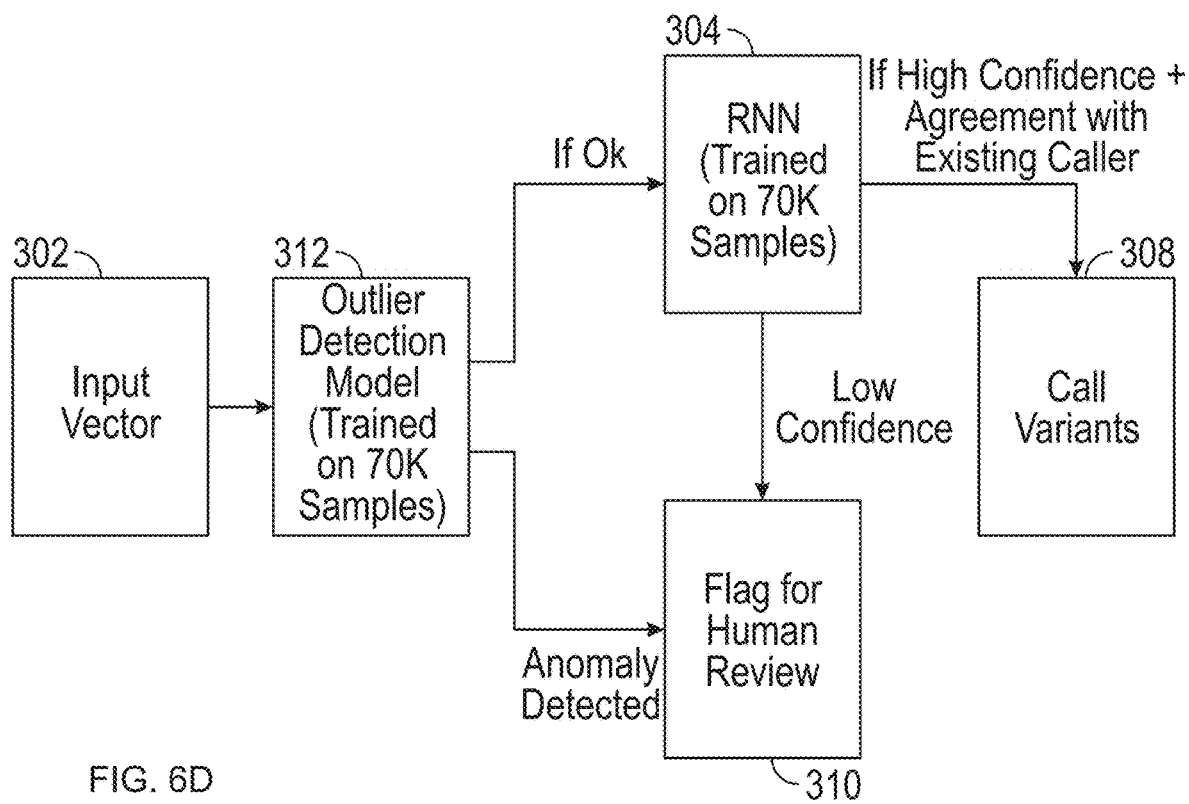
FIG. 6D illustrates another exemplary process for determining one or more carrier statuses associated with the genome (or portion of the genome) being sequenced in which anomaly detection and flagging for review are utilized according to examples of the disclosure.

FIG. 6D illustrates another exemplary process for determining one or more carrier statuses associated with the genome (or portion of the genome) being sequenced in which anomaly detection and flagging for review are utilized according to examples of the disclosure.

FIG. 6D illustrates another exemplary process 303 for determining one or more carrier statuses associated with the genome being sequenced in which anomaly detection and flagging for review are utilized according to examples of the disclosure. Input vector 302 can be inputted to anomaly detection model 312. If anomaly detection model 312 determines that the data in input vector 302 is not anomalous (e.g., as described with reference to 312 in FIG. 6C), then that input vector 302 can be inputted to RNN 304. If, however, anomaly detection model 312 determines that the data in input vector 302 is anomalous, then the SNP data, copy number data, variant calls and/or confidence levels can be flagged for review (e.g., flagged for human review) at 310, without inputting vector 302 to RNN 304 (e.g., as described with reference to 310 in FIG. 3C).

If RNN 304 is able to produce variant calls 308 with relatively high confidence levels (e.g., confidence levels greater than a threshold confidence level, such as 0.8, 0.9 or 1.0 on the above-described scale from 0 to 1), then it can output those variant calls at 308. In some examples, RNN 304 may be required to produce variant calls 308 at the above relatively high confidence level, and those variant calls may be required to be in agreement with another variant calling algorithm (a non-RNN-based variant caller, or a variant caller other than the RNN-based caller described here, such as a variant calling algorithm that uses base counting and a log-odds ratio threshold to classify variants, or a variant calling algorithm based on manual review of the sequencing data) in order for RNN 304 to output those variant calls at 308. However, if RNN 304 is not able to produce variant calls 308 at such a high confidence level (e.g., the confidence level is less than or equal to the above threshold confidence level and/or the variant calls produced by RNN 304 are not in agreement with the other variant calling algorithm), then RNN 304 does not output variant calls 308; rather, the SNP data, copy number data, variant calls and/or confidence levels are flagged for review (e.g., flagged for human review) at 310 (e.g., as described with reference to 310 in FIG. 3C).

Figure 7A:
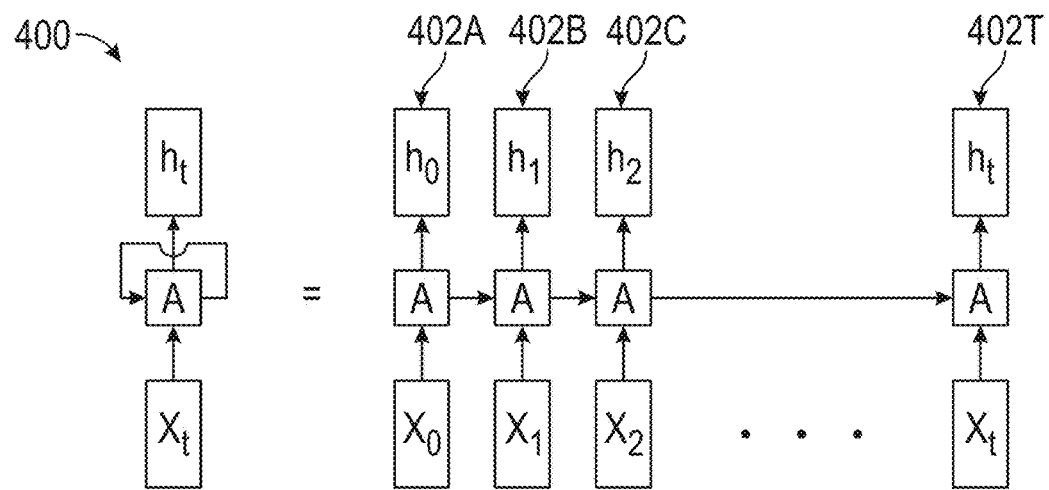
FIGS. 7A-7B illustrate exemplary details of an RNN that can be utilized for determining one or more carrier statuses associated with the genome (or portion of the genome) being sequenced according to examples of the disclosure.
Figure 7B:
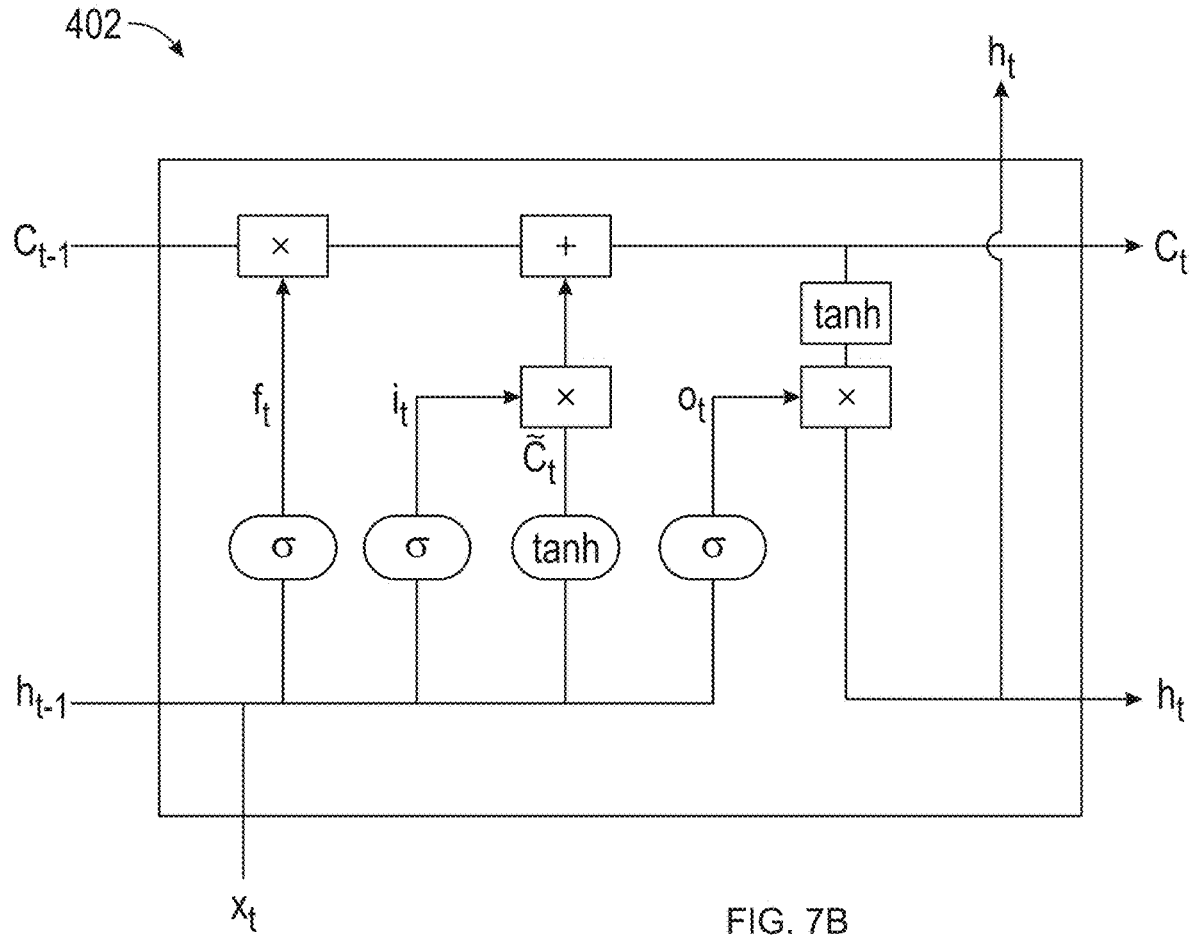

FIGS. 7A-7B illustrate exemplary details of an RNN that can be utilized for determining one or more carrier statuses associated with the genome (or portion of the genome) being sequenced according to examples of the disclosure.

As previously mentioned, various machine learning algorithms and/or architectures can be utilized in making carrier status determinations based on SNP and copy number data according to the examples of the disclosure. In some examples, RNNs can be utilized. FIGS. 7A-7B illustrate exemplary details of an RNN that can be utilized for determining one or more carrier statuses associated with the genome (or portion of the genome) being sequenced according to examples of the disclosure. For example, as shown in FIG. 4A, RNN 400 having input(s) $X_t$, output(s) $h_t$ and transition function F can be utilized. Input(s) $X_t$ can be the SNP and copy number data of the genome being sequenced, and output(s) $h_t$ can be the determined carrier statuses of the genome being sequenced—exemplary details of input(s) $X_t$ and output(s) $h_t$ will be described with reference to FIG. 8. When unrolled or unfolded, RNN 400 can be represented by layers 402A, 402B, etc., where layer 402A can have input Xo (e.g., first SNP or copy number data value) and output ho, layer 402B can have input Xi (e.g., second SNP or copy number data value) and output hi, etc. RNN 400 can be structured to receive, as inputs, input vector 302, and output call variants and/or confidence scores 306 or 308, exemplary details of which will be described with reference to FIG. 8. In some examples, an RNN of the disclosure can have different structure depending on the form of the input vector and the output call variants, which can be different for different genetic conditions to be determined (e.g., different numbers of copy number data points, different numbers of SNP data points due to different numbers of known SNPs that contribute to the different genetic conditions, different numbers of carrier statuses to be determined due to different numbers of carrier statuses associated with different genetic conditions, SNP data relating to a particular variant location separated by probe (e.g., as compared with aggregated SNP data from multiple probes for a particular variant location), etc.)—such RNNs can be structured analogously to those described here.

FIG. 7B illustrates exemplary details of a given layer of RNN 400 according to examples of the disclosure. The structure of FIG. 7B can be the structure of each of layers 402A, 402B, etc., which can be structured as long-short term memory (LSTM) cells. Each cell can operate according to the following equations: $f_t = s(W_f \cdot [h_{t-i}, x_t] + b_f)$ $i_t + s(Wi \cdot [h_{t-i}, x_t] + bi)$ $C_t = \tanh(W_c \cdot [h_{t-i}, x_t] + be)$ $C_t = f_t * C_{t-i} + i_t * C_t$ = state of cell/layer $t$ $o_t = s(Wo \cdot [h_{t-i}, \frac{3}{4}] + b_0)$ $h_t = o_t * \tanh(C_t)$ where $x_t$ can be the input vector for the LSTM cell, $f_t$ can be the forget gate's activation function, $i_t$ can be the input gate's activation function, $o_t$ can be the output gate's activation function, $h_t$ can be the output vector of the LSTM cell, W and b can be weight matrix and bias vector parameters that can be learned during training, s can be a Sigmoid function, and * can be a Hadamard (entry-wise) product.

Because genomic samples that are not carriers for one or more genetic conditions, such as CAH, can far outnumber genomic samples that are carriers for one or more genetic conditions (e.g., because genetic conditions can be relatively rare), the data on which RNN 400 can be trained and/or to which RNN 400 can be applied can have a relatively large class imbalance between negative samples (e.g., genomic samples that are not carriers for one or more genetic conditions) and positive samples (e.g., genomic samples that are carriers for one or more genetic conditions). As such, it can be beneficial to utilize weighted cross-entropy loss functions in the RNN-based processes of the disclosure to up-weight the significance of positive samples on RNN operation when training the RNN. One exemplary weighted cross-entropy loss function can be expressed as:

$$L = -\frac{1}{N} \sum_{i=1}^{N} \sum_{j=1}^{M} [C_j y_{ij} \log \hat{y}_{ij} + (1 - y_{ij}) \log(1 - \hat{y}_{ij})]$$

where $y_{ij}$ can be the carrier status for a given patient (sample) i and variant j (e.g., if patient (sample) i is a carrier for variant j, $y_{3/4}=1$, and if patient (sample) i is not a carrier for variant j, $y_{ij}=0$), $y_{ij}$ can be the probability of finding $y_{ij}=1$, and Q can be expressed as:

$$C_j = \text{positive oversampling coefficient for variant } j = \frac{\text{number of negative examples, variant } j}{\text{number of positive samples, variant } j}$$

A loss function (e.g., the weighted cross-entropy loss function above) can be a metric that measures how well the predictions of the variant callers of the disclosure agree with the provided training data (e.g., higher is worse agreement, lower is better agreement). In some examples, the RNN parameters can be varied so as to gradually decrease this loss function so as to train the RNN, as described in this disclosure. In the specific loss function shown above, the average cross-entropy loss over all N samples in the relevant set (e.g., the size of the training set). Further, the respective losses over each of the M variants of interest can be summed (e.g., 11 variants in the case of one of the CAH callers of the disclosure).

The SNP, copy number and carrier status ("variant call") data used to train the RNNs of the disclosure and used during the operation of the RNNs of the disclosure to determine carrier status can be represented in any suitable manner, though some ways of representing the above data can result in better RNN performance (e.g., more accurate carrier status determinations, faster carrier status determinations, etc.) than others. FIG. 5 illustrates exemplary structures of SNP, copy number and carrier status data according to examples of the disclosure. SNP data 510 and copy number data 512 and 514 can be as described with reference to FIG. 2B for a gene-pseudogene pair of interest. Such data for use in the RNNs of the disclosure can be represented as illustrated in FIG. 5. Specifically, in some examples, carrier status determinations can be represented as one-dimensional array y 504 having one entry for each carrier status to be determined (in the case of using the RNNs of the disclosure to determine carrier status from SNP and copy number data) or one entry for each known carrier status (in the case of training the RNNs of the disclosure using SNP and copy number data for known carrier statuses). For example, for the purposes of using the RNNs of the disclosure in the context of CYP21A2 and CYP21A1P for CAH, array y 504 can include 10 entries corresponding to P31L, C293-13, C332-339, 1173N, V238Clstr, V282L, L308X, Q319X, R357W and P454S carriers (and in some examples, an entry corresponding to the 30-kb deletion as well). It is understood that additional or alternative variants (and variant-entries) can be utilized. In the context of other gene-pseudogene pairs of interest, array y can include fewer or more entries, each corresponding to a carrier status of interest. In some examples, array y can include more than one entry per carrier status—for example, to be able to separately provide carrier status/variant determinations on a per-chromosome or per-gene basis. For example, if the carrier status of interest is one that can show up separately in each chromosome of the individual, array y can be twice the length of the above examples (i.e., array y can include two entries per carrier status: one for the carrier status in the first chromosome of the individual, and one for the carrier status in the second chromosome of the individual) to separately indicate the existence or non-existence of the variant of interest in each of the first and second chromosomes of the individual. For some genes, array y may need to be arbitrarily increased in length to add additional entries for a given carrier status, because some patients may have more than two copies of the gene of interest (e.g., in the case of CAH, more than two copies of CYP21A2), and thus array y can include sufficient entries for a given carrier status to correspond to each of the more than two copies of the gene of interest.

In some examples, the values for each entry in array y 504 can be binary (e.g., 0 for non-carrier, and 1 for carrier). In some examples, the values for each entry can indicate the confidence with which such carrier status is expressed/determined (such as described herein). In some examples, the values for each entry in array y 504 can be binary for training purposes and can indicate the confidence with which such carrier status is expressed/determined when the RNN is being used to determine variant calls. The ordering of the entries in array y 504 can be varied. Because RNNs can be especially effective in the context of sequential data, the performance of the RNN-based processes of the disclosure can be improved by representing the carrier status data in array y 504 in a manner having a sequential characteristic that corresponds to the sequence of the genetic material in the gene/pseudogene of interest. For example, in some examples, the ordering of the entries in array y 504 can correspond to the positioning of the mutations in the gene/pseudogene of interest associated with each carrier status. For example, an entry for a carrier status that is associated with a mutation closest to the 5' end of the gene/pseudogene of interest can be located at the first position in array y 504, an entry for a carrier status that is associated with a mutation closest to the 3' end of the gene/pseudogene of interest can be located at the last position in array y 504, and entries for carrier statuses that are associated with mutations at other positions in the gene/pseudogene can be located at other corresponding positions in array y 504. In some examples, the ordering of the carrier status entries in array y 504 may not correspond to the positioning of the mutations in the gene/pseudogene of interest associated with each carrier status and may be independent of such positioning.

In some examples, SNP and copy number data can be combined into a single one-dimensional input array x. The ordering of the entries in array x can be varied. For example, in array x 502A, copy number and SNP data can be arranged such that copy number data from the 5' end of the gene of interest to the 3' end of the gene of interest can be located in the first part of array x 502A (e.g., the first 28 entries of array x 502A in the case where copy number data from 28 positions across the gene is available), copy number data from the 5' end of the corresponding pseudogene to the 3' end of the corresponding pseudogene can be located in the second part of array x 502A (e.g., the second 28 entries of array x 502A in the case where copy number data from 28 positions across the pseudo gene is available), and SNP data from the 5' end of the gene and/or pseudogene to the 3' end of the gene and/or pseudogene can be located in the third part of array x 502A (e.g., the last 20 entries of array x 502A in the case where SNP data from 10 positions across the gene is available, and SNP data from 10 positions across the pseudogene is available, or the last 10 entries of array x 502A in the case where SNP data from 10 positions across the gene is available but no SNP data from the pseudogene is available or utilized). For example, the contents and order of array x can be expressed as:

$$x = [CN_{gene,i}, CN_{gene,i+1}, CN_{gene,i+2}, \ldots, CN_{pseudogene,i},$$
$$CN_{pseudogene,i+1}, CN_{pseudogene,i+2}, \ldots, SNP_{gene,i},$$
$$SNP_{gene,i+1}, SNP_{gene,i+2}, \ldots, SNP_{pseudogene,i},$$
$$SNP_{pseudogene,i+1}, SNP_{pseudogene,i+2}, \ldots ]$$

where $CN_{gene,i}$ can be the copy number data for the gene at position i, $SNP_{gene,i}$ can be the SNP data for the gene at position i, $CN_{pseudogene,i}$ can be the copy number data for the pseudogene at position i, and $SNP_{pseudogene,i}$ can be the SNP data for the gene at position i. If no copy number or SNP data exists for a given position in the gene or pseudogene, the corresponding entry in array x can be omitted. The above arrangement of the SNP and copy number data is illustrated in array x 502A of FIG. 5, where Ci to C56 correspond to the 56 entries of copy number data described above, and S i to S20 correspond to the 20 entries of SNP data described above Because RNNs can be especially effective in the context of sequential data, the performance of the RNN-based processes of the disclosure can be improved by representing the SNP and copy number data in a manner have a sequential characteristic that corresponds to the sequence of the genetic material in the gene/pseudogene of interest. For example, SNP and copy number data can be organized in array x such that the order in which the SNP and copy number data appears in array x corresponds to the location in the gene/pseudogene to which the SNP and copy number data corresponds. More specifically, SNP and copy number data corresponding to a position closest to the 5' end of the gene/pseudogene can be located at the front end of array x, SNP and copy number data corresponding to a position closest to the 3' end of the gene/pseudogene can be located at the back end of array x, and SNP and copy number data corresponding to other positions in the gene/pseudogene can be located at other corresponding positions in array x. For example, the contents and order of array x can be expressed as:

$$x = [CN_{gene,i}, SNP_{gene,i}, CN_{pseudogene,i}, SNP_{pseudogene,i},$$
$$CN_{gene,i+1}, SNP_{gene,i+1}, CN_{pseudogene,i+1},$$
$$SNP_{pseudogene,i+1}, \ldots ],$$

$$x = [CN_{gene,i}, CN_{pseudogene,i}, SNP_{gene,i}, CN_{gene,i+1},$$
$$CN_{pseudogene,i+1}, SNP_{gene,i+1}, CN_{gene,i+2},$$
$$CN_{pseudogene,i+2}, SNP_{gene,i+2}, \ldots ], \text{ or}$$

$$x = [CN_{gene,i}, CN_{pseudogene,i}, SNP_{gene,i}, SNP_{pseudogene,i},$$
$$CN_{gene,i+1}, CN_{pseudogene,i+1}, SNP_{gene,i+1},$$
$$SNP_{pseudogene,i+1}, \ldots ]$$

where $CNg_e n_e,i$ can be the copy number data for the gene at position i, $SNP_{ge}n_e,i$ can be the SNP data for the gene at position i, $CNp_{seudoge}n_e,i$ can be the copy number data for the pseudogene at position i, and $SNP_{pSeudoge}n_{e,i}$ can be the SNP data for the gene at position i. If no copy number or SNP data exists for a given position in the gene or pseudogene, the corresponding entry in array x can be omitted. The above arrangement of the SNP and copy number data is illustrated in array x 502B of FIG. 7.

Other arrangements of SNP and copy number data in array x are also within the scope of the disclosure. Below are some additional exemplary arrangements for such data, some of which have a partial or full sequential characteristic that corresponds to the sequence of the genetic material in the gene/pseudogene of interest:

$$x = [SNP_{gene,i}, SNP_{pseudogene,i}, SNP_{gene,i+1},$$
$$SNP_{pseudogene,i+1}, \ldots, CN_{gene,i}, CN_{pseudogene,i},$$
$$CN_{gene,i+1}, CN_{pseudogene,i+1}, \ldots ]$$

$$x = [SNP_{gene,i}, SNP_{gene,i+1}, \ldots, SNP_{pseudogene,i},$$
$$SNP_{pseudogene,i+1}, \ldots, CN_{gene,i},$$
$$CN_{gene,i+1}, \ldots, CN_{pseudogene,i},$$
$$CN_{pseudogene,i+1}, \ldots ]$$

While the data above was discussed in the context of arrays, it is understood that other data structures (e.g., matrices, lists, etc.)—some of which that can be used to convey ordering of their entries (e.g., an ordering characteristic that can convey a "first" position, a "last" position, and/or relative positions of entries within the data structure, etc.), and some of which that do not convey data ordering of their entries—can additionally or alternatively be used to represent the copy number data, the SNP data and/or the carrier status determinations. While the examples of the disclosure have been described with the RNN determining carrier statuses of the individual, it is understood that the RNN can be analogously configured to additionally or alternatively determine the number of functional copies of a given gene in the individual's genome (which is related to the carrier statuses described above). In such examples, the output data from the RNN (e.g., during training and/or during use) can include the number of functional copies of a given gene additionally or alternatively to the carrier statuses of the individual.

Figure 8:
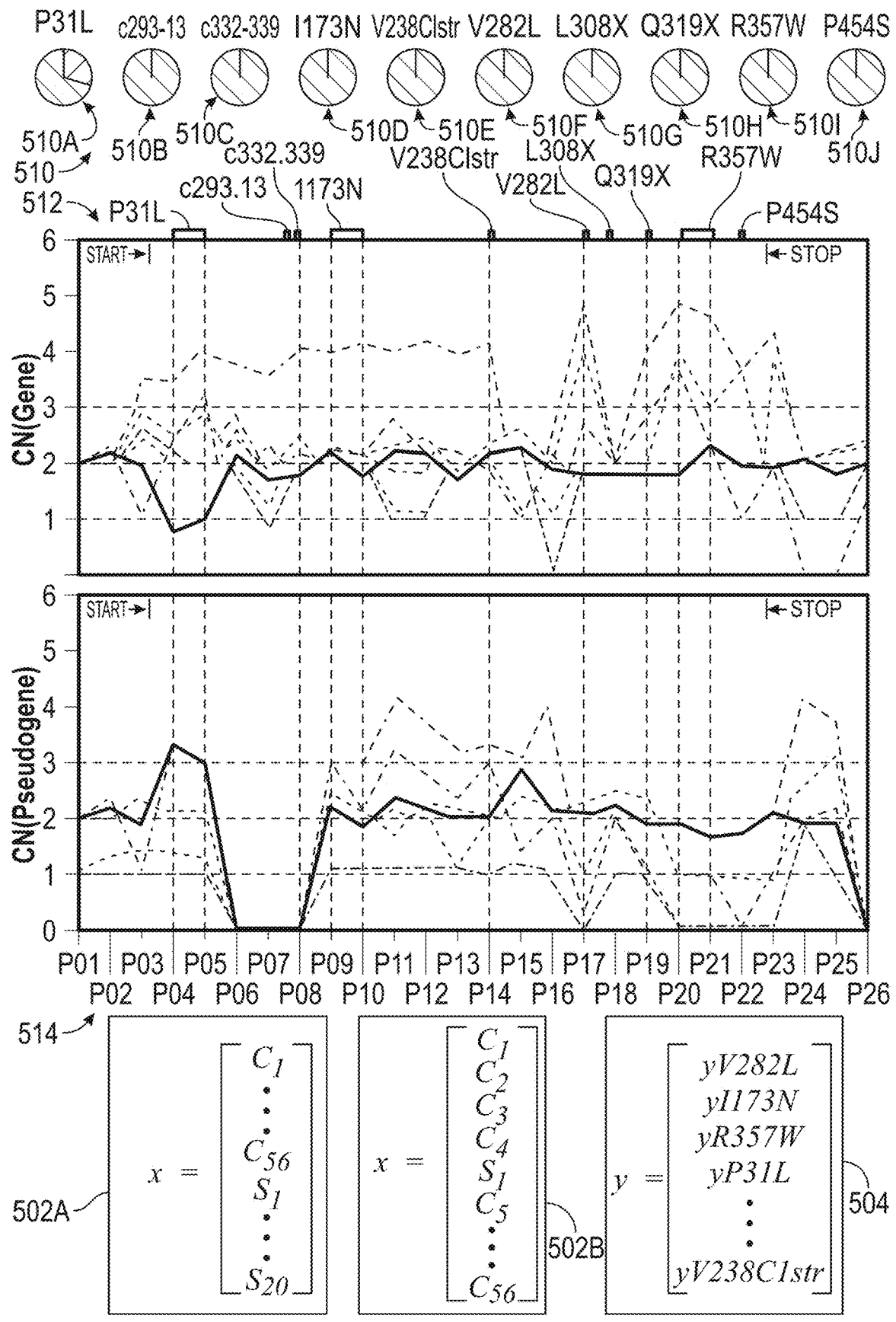
FIG. 8 illustrates exemplary structures of SNP, copy number and carrier status data according to one or more examples of the disclosure.

FIG. 8 illustrates exemplary structures of SNP, copy number and carrier status data according to one or more examples of the disclosure.

Figure 9:
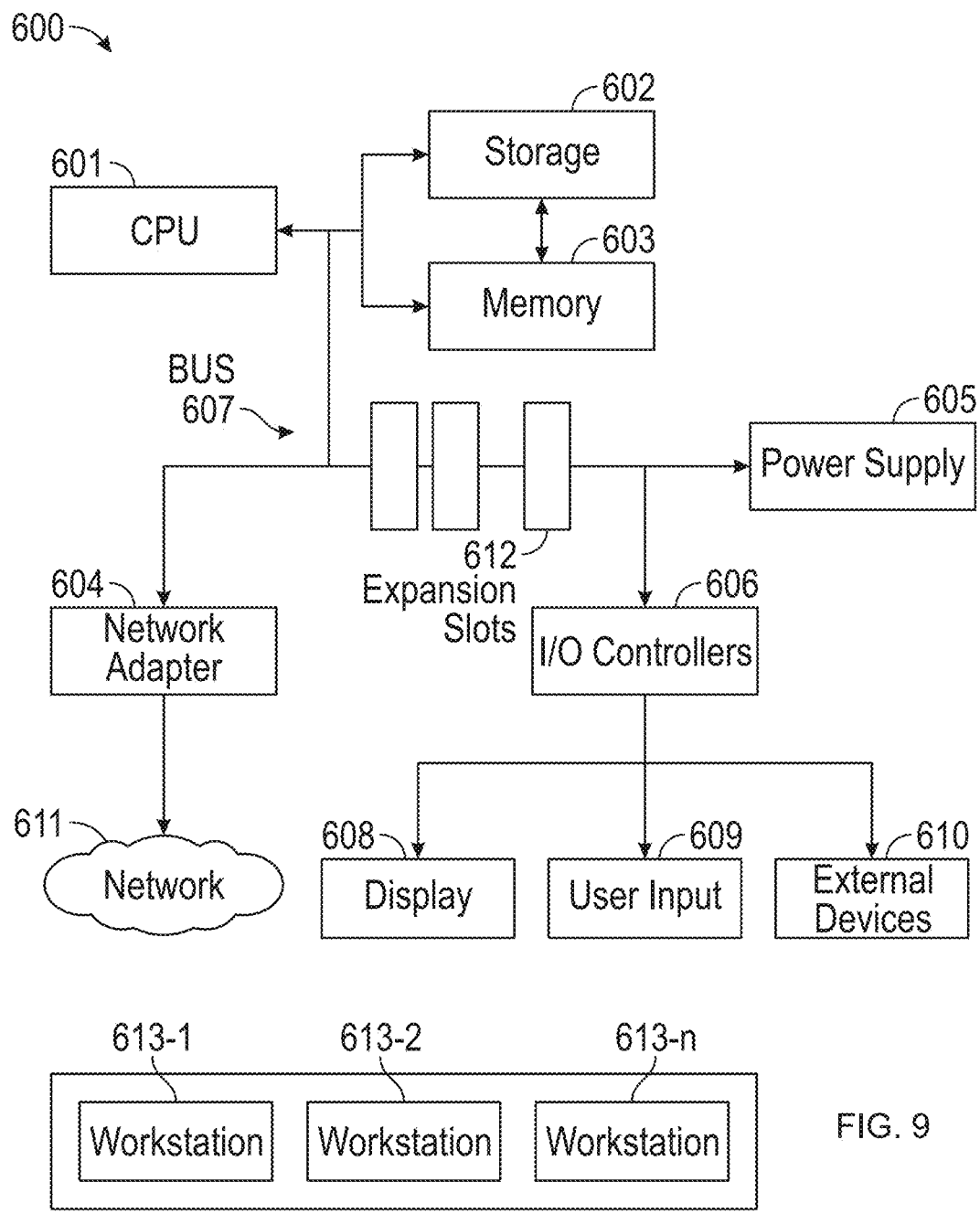
FIG. 9 illustrates an exemplary computing system or electronic device for implementing the examples of the disclosure.

FIG. 9 illustrates an exemplary computing system or electronic device for implementing the examples of the disclosure. System 600 may include, but is not limited to known components such as central processing unit (CPU) 601, storage 602, memory 603, network adapter 604, power supply 605, input/output (I/O) controllers 606, electrical bus 607, one or more displays 608, one or more user input devices 609, and other external devices 610. It will be understood by those skilled in the art that system 600 may contain other well-known components which may be added, for example, via expansion slots 612, or by any other method known to those skilled in the art. Such components may include, but are not limited, to hardware redundancy components (e.g., dual power supplies or data backup units), cooling components (e.g., fans or water-based cooling systems), additional memory and processing hardware, and the like.

System 600 may be, for example, in the form of a client-server computer capable of connecting to and/or facilitating the operation of a plurality of workstations or similar computer systems over a network. In another embodiment, system 600 may connect to one or more workstations over an intranet or internet network, and thus facilitate communication with a larger number of workstations or similar computer systems. Even further, system 600 may include, for example, a main workstation or main general-purpose computer to permit a user to interact directly with a central server. Alternatively, the user may interact with system 600 via one or more remote or local workstations 613. As will be appreciated by one of ordinary skill in the art, there may be any practical number of remote workstations for communicating with system 600.

CPU 601 may include one or more processors, for example Intel® Core™ G7 processors, AMD FX™ Series processors, or other processors as will be understood by those skilled in the art (e.g., including graphical processing unit (GPU)-style specialized computing hardware used for, among other things, machine learning applications, such as training and/or running the machine learning algorithms of the disclosure; such GPUs may include, e.g., NVIDIA Tesla™ K80 processors). CPU 601 may further communicate with an operating system, such as Windows NT® operating system by Microsoft Corporation, Linux operating system, or a Unix-like operating system. However, one of ordinary skill in the art will appreciate that similar operating systems may also be utilized. Storage 602 (e.g., non-transitory computer readable medium) may include one or more types of storage, as is known to one of ordinary skill in the art, such as a hard disk drive (HDD), solid state drive (SSD), hybrid drives, and the like. In one example, storage 602 is utilized to persistently retain data for long-term storage. Memory 603 (e.g., non-transitory computer readable medium) may include one or more types of memory as is known to one of ordinary skill in the art, such as random access memory (RAM), read-only memory (ROM), hard disk or tape, optical memory, or removable hard disk drive. Memory 603 may be utilized for short-term memory access, such as, for example, loading software applications or handling temporary system processes.

As will be appreciated by one of ordinary skill in the art, storage 602 and/or memory 603 may store one or more computer software programs. Such computer software programs may include logic, code, and/or other instructions to enable processor 601 to perform the tasks, operations, and other functions as described herein (e.g., the RNN functions described herein), and additional tasks and functions as would be appreciated by one of ordinary skill in the art. Operating system 602 may further function in cooperation with firmware, as is well known in the art, to enable processor 601 to coordinate and execute various functions and computer software programs as described herein. Such firmware may reside within storage 602 and/or memory 603.

Moreover, I/O controllers 606 may include one or more devices for receiving, transmitting, processing, and/or interpreting information from an external source, as is known by one of ordinary skill in the art. In one embodiment, I/O controllers 606 may include functionality to facilitate connection to one or more user devices 609, such as one or more keyboards, mice, microphones, trackpads, touchpads, or the like. For example, I/O controllers 606 may include a serial bus controller, universal serial bus (USB) controller, Fire-Wire controller, and the like, for connection to any appropriate user device. I/O controllers 606 may also permit communication with one or more wireless devices via technology such as, for example, near-field communication (NFC) or Bluetooth™. In one embodiment, I/O controllers 606 may include circuitry or other functionality for connection to other external devices 610 such as modem cards, network interface cards, sound cards, printing devices, external display devices, or the like. Furthermore, I/O controllers 606 may include controllers for a variety of display devices 608 known to those of ordinary skill in the art. Such display devices may convey information visually to a user or users in the form of pixels, and such pixels may be logically arranged on a display device in order to permit a user to perceive information rendered on the display device. Such display devices may be in the form of a touch screen device, traditional non-touch screen display device, or any other form of display device as will be appreciated be one of ordinary skill in the art.

Furthermore, CPU 601 may further communicate with I/O controllers 606 for rendering a graphical user interface (GUI) on, for example, one or more display devices 608. In one example, CPU 601 may access storage 602 and/or memory 603 to execute one or more software programs and/or components to allow a user to interact with the system as described herein. In one embodiment, a GUI as described herein includes one or more icons or other graphical elements with which a user may interact and perform various functions. For example, GUI 607 may be displayed on a touch screen display device 608, whereby the user interacts with the GUI via the touch screen by physically contacting the screen with, for example, the user's fingers. As another example, GUI may be displayed on a traditional non-touch display, whereby the user interacts with the GUI via keyboard, mouse, and other conventional I/O components 609. GUI may reside in storage 602 and/or memory 603, at least in part as a set of software instructions, as will be appreciated by one of ordinary skill in the art. Moreover, the GUI is not limited to the methods of interaction as described above, as one of ordinary skill in the art may appreciate any variety of means for interacting with a GUI, such as voice-based or other disability-based methods of interaction with a computing system.

Moreover, network adapter 604 may permit device 600 to communicate with network 611. Network adapter 604 may be a network interface controller, such as a network adapter, network interface card, LAN adapter, or the like. As will be appreciated by one of ordinary skill in the art, network adapter 604 may permit communication with one or more networks 611, such as, for example, a local area network (LAN), metropolitan area network (MAN), wide area network (WAN), cloud network (IAN), or the Internet.

One or more workstations 613 may include, for example, known components such as a CPU, storage, memory, network adapter, power supply, I/O controllers, electrical bus, one or more displays, one or more user input devices, and other external devices. Such components may be the same, similar, or comparable to those described with respect to system 600 above. It will be understood by those skilled in the art that one or more workstations 613 may contain other well-known components, including but not limited to hardware redundancy components, cooling components, additional memory/processing hardware, and the like.

EXAMPLE

A total of 37,841 samples were split between training and test sets (in an 80%-20% ratio). The model performance was assessed on 7,568 samples in the test set. Performance was assessed by counting variant calls as independent. The overall accuracy is 99.99%, and the f1 score is 0.998 (see Table 1).

TABLE 1

|  | Value |
|---|---|
| TN | 89,626 |
| TP | 1,180 |
| FN | 5 |
| FP | 5 |
| Total | 90,816 |
| Accuracy | 0.9999 |
| Sensitivity | 0.9958 |
| Specificity | 0.9999 |
| PPV | 0.9958 |
| f1 | 0.9958 |

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A computer-implemented method for an improved training of recurrent neural networks to determine a respective carrier status of an individual, the method comprising:
   generating, by the one or more processors, a set of training data comprising, for each sample, (i) copy number data indicative of a number of copies of genetic material corresponding to a gene of interest, and (ii) allele variant data indicative of a number of sequencing reads from a location of each genetic variation in the gene of interest;
   segmenting, by the one or more processors, the copy number data and the allele variant into one or more training arrays;
   arranging, by the one or more processors, the one or more training arrays according to a sequential characteristic that corresponds to a sequence of the genetic material for the gene of interest;
   training, by one or more processors coupled to memory, a recurrent neural network model to generate a carrier status array as output by providing the one or more training arrays having the sequential characteristic that corresponds to the sequence of the genetic material for the gene of interest as input to the recurrent neural network model and updating the recurrent neural network model based on corresponding outputs of the recurrent neural network model and predetermined information related to a plurality of genetic variants in previously-sequenced samples corresponding to the set of training data;
   determining, by the one or more processors, for the individual, a normalized read depth for the gene in a genome of the individual and allele dosage data for the gene; and
   feeding, by the one or more processors, as input, an input array including the normalized read depth and the allele dosage data to the trained recurrent neural network model, causing the trained recurrent neural network model to generate an output array comprising the respective carrier status of the individual for each variant of the plurality of genetic variants, the output array arranged such that each respective carrier status is positioned in the output array according to an order in which the plurality of genetic variants occur in the gene.

2. The method of claim 1 wherein the predetermined information comprises adjudicated variant calls for the plurality of genetic variants.

3. The method of claim 2 wherein the adjudicated variant calls comprise heuristic data analysis and expert human review as a truth set.

4. The method of claim 1 wherein each genetic variant comprises at least one of the group comprising: a substitution variant, an indel, a gene duplication, gene deletion, and a gene fusion.

5. The method of claim 1 wherein the predetermined information comprises at least one of the group comprising:

human adjudicated variant calls and binary class labels for a particular or set of variants.

6. The method of claim 1 wherein the input array comprises data corresponding to probe locations and features.

7. The method of claim 6 wherein the features comprise at least one of allele dosage data per probe or depth data per probe.

8. The method of claim 1 wherein the recurrent neural network model comprises a plurality of long short-term memory (LSTM) network cells linked sequentially in the recurrent neural network model.

9. The method of claim 8, wherein the recurrent neural network model further comprises a plurality of layers of long short-term memory (LSTM) network cells.

10. The method of claim 8 wherein each of the LSTM cells comprises a plurality of gates adapted to control information flow.

11. The method of claim 1 wherein the recurrent neural network model further comprises a fully connected sigmoid function.

12. The method of claim 1 wherein the input array is arranged to correspond to sequential features across the genome.

13. The method of claim 1 wherein training the recurrent neural network model comprises optimizing the recurrent neural network model.

14. The method of claim 1 wherein training the recurrent neural network model comprises automated retraining protocols.

15. The method of claim 14 wherein the automated retraining protocol is adapted to synchronize the operation of training over time.

16. The method of claim 14 wherein the automated retraining protocol is adapted to reduce drift and repetitively validate performance over time.

17. The method of claim 1 wherein the recurrent neural network model further outputs a confidence level for the respective carrier status.

18. A computer-implemented method for an improved training of a recurrent neural network to determine a number of functional copies of a gene within a genome of an individual, the method comprising:
   generating, by the one or more processors, a set of training data comprising, for each sample, (i) copy number data indicative of a number of copies of genetic material corresponding to a gene of interest, and (ii) SNP data indicative of a number of sequencing reads from a location of the genetic variation in the gene of interest;
   arranging, by the one or more processors, the SNP data according to a sequential characteristic that corresponds to a sequence of the genetic material for the gene of interest;
   training, by one or more processors coupled to memory, a recurrent neural network model by providing the one or more training arrays having the sequential characteristic that corresponds to the sequence of the genetic material for the gene of interest as input to the recurrent neural network model and updating the recurrent neural network model based on corresponding outputs of the recurrent neural network model and based on predetermined information related to at least one genetic variant in previously-sequenced samples corresponding to the set of training data;
   determining, by the one or more processors, for the individual, copy number data for the gene and SNP data for the gene; and
   feeding, by the one or more processors, as input, an input array comprising the copy number data and the SNP data of the individual to the trained recurrent neural network model, causing the trained recurrent neural network model to generate an output array comprising the number of functional copies of the gene, the output array arranged according to an order of the input array.

19. A system adapted to provide an improved training of a recurrent neural network to determine a respective carrier status of an individual comprising:
   one or more processors configured to:
      generate a set of training data comprising, for each sample, (i) copy number data indicative of a number of copies of genetic material corresponding to a gene of interest, and (ii) allele variant data indicative of a number of sequencing reads from a location of each genetic variation in the gene of interest;
      segment the copy number data and the allele variant into one or more training arrays;
      arrange the one or more training arrays according to a sequential characteristic that corresponds to a sequence of the genetic material for the gene of interest;
      execute a recurrent neural network model trained to generate a carrier status array as output by providing the set of training data as input to the recurrent neural network model;
      update the recurrent neural network model based on corresponding outputs of the recurrent neural network model and predetermined information related to a plurality of genetic variants in previously-sequenced samples corresponding to the one or more training arrays, the training data comprising, for each sample, (i) copy number data indicative of a number of copies of genetic material corresponding to a gene of interest, and (ii) allele variant data indicative of a number of sequencing reads from a location of each genetic variation in the gene of interest;
      determine, for the individual, a normalized read depth for the gene in a genome of the individual and allele dosage data for the gene; and
      feed, as input, an input array including the normalized read depth and the allele dosage data to the trained recurrent neural network model, the trained recurrent neural network model configured to generate an output array comprising the respective carrier status of the individual for each variant of the plurality of genetic variants, the output array arranged such that each respective carrier status is positioned in the output array according to an order in which the plurality of genetic variants occur in the gene.

20. The system of claim 19 wherein the recurrent neural network model comprises a plurality of long short-term memory (LSTM) network cells linked sequentially in the recurrent neural network model.

21. The system of claim 20 wherein the recurrent neural network model further comprises a plurality of layers of long short-term memory (LSTM) network cells.

22. The system of claim 19 wherein the recurrent neural network model further comprises a fully connected sigmoid function.

23. The method of claim 18, wherein only the SNP data and the copy number data are fed to the recurrent neural network model as inputs to obtain the number of functional copies of the gene as output.

24. The method of claim 18, wherein the recurrent neural network model indicates whether the individual has congenital adrenal hyperplasia (CAH) based on a lack of a functional copy of a CYP21A2 gene.

\* \* \* \* \*